US011061215B2

(12) United States Patent
Yamada

(10) Patent No.: US 11,061,215 B2
(45) Date of Patent: Jul. 13, 2021

(54) MICROSCOPE SYSTEM

(71) Applicant: OLYMPUS CORPORATION, Tokyo (JP)

(72) Inventor: Tatsuki Yamada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 470 days.

(21) Appl. No.: 15/953,952

(22) Filed: Apr. 16, 2018

(65) Prior Publication Data

US 2018/0314049 A1    Nov. 1, 2018

(30) Foreign Application Priority Data

Apr. 27, 2017    (JP) .............................. JP2017-088188

(51) Int. Cl.
| G02B 21/36 | (2006.01) |
| G02B 21/26 | (2006.01) |
| G02B 21/02 | (2006.01) |
| G02B 21/08 | (2006.01) |

(52) U.S. Cl.
CPC .......... *G02B 21/365* (2013.01); *G02B 21/02* (2013.01); *G02B 21/088* (2013.01); *G02B 21/26* (2013.01); *G02B 21/367* (2013.01); *G02B 21/368* (2013.01)

(58) Field of Classification Search
None
See application file for complete search history.

(56) References Cited

U.S. PATENT DOCUMENTS

| 6,344,930 B1 | 2/2002 | Kaneko et al. |
| 2007/0008419 A1* | 1/2007 | Ariga ................. G01N 21/6456 348/272 |
| 2010/0141752 A1 | 6/2010 | Yamada et al. |
| 2010/0272334 A1 | 10/2010 | Yamada et al. |
| 2010/0322502 A1* | 12/2010 | Otsuka .................. G06T 7/0012 382/133 |
| 2013/0016192 A1 | 1/2013 | Shibata |
| 2015/0185465 A1 | 7/2015 | Karube |
| 2018/0067296 A1 | 3/2018 | Sugie et al. |

FOREIGN PATENT DOCUMENTS

| JP | 2000-316120 A | 11/2000 |
| JP | 2010-134195 A | 6/2010 |
| JP | 2013-020140 A | 1/2013 |
| JP | 2015-127772 A | 7/2015 |
| JP | 2017-006330 A | 1/2017 |

* cited by examiner

*Primary Examiner* — Derek S. Chapel
(74) *Attorney, Agent, or Firm* — Scully, Scott, Murphy & Presser, P.C.

(57) ABSTRACT

Provided is a microscope system including: a stage on which a multi-dyed specimen is mounted; an objective lens for collecting light from the specimen mounted on the stage; a Z-axis movement section for relatively moving the stage and the objective lens in a direction along the optical axis L of the objective lens; an XY-axis movement section for moving the stage in a direction orthogonal to the optical axis L; an image acquisition unit for acquiring a color image by capturing the light collected by the objective lens; and a depth-extension processing unit for generating a depth-extended image by performing depth extension processing dye by dye on the basis of a plurality of the color images that are acquired by the image acquisition unit at different positions of the stage relative to the objective lens set with the Z-axis movement section.

15 Claims, 9 Drawing Sheets

MICROSCOPE SYSTEM

CROSS-REFERENCE TO RELATED APPLICATIONS

This application is based on Japanese Patent Application No. 2017-088188, the contents of which are incorporated herein by reference.

TECHNICAL FIELD

The present invention relates to a microscope system.

BACKGROUND ART

There is a well-known microscope for combining images acquired at a plurality of different positions in the optical-axis direction while moving an objective lens in a direction along the optical axis, wherein movement of the objective lens in the direction along the optical axis and image acquisition processing are performed asynchronously (refer to, for example, PTL 1).

There is also a well-known microscope for generating an omnifocal image in a pseudo-real-time manner by moving the focal position at high speed in a direction along the optical axis of an objective lens using an actuator and a vari-focus lens (refer to, for example, Patent Literature 2).

CITATION LIST

Patent Literature

{PTL 1}
Japanese Unexamined Patent Application, Publication No. 2015-127772
{PTL 2}
Japanese Unexamined Patent Application, Publication No. 2000-316120

SUMMARY OF INVENTION

The present invention provides the following solutions.

One aspect of the present invention provides a microscope system including: a stage on which a multi-dyed specimen is mounted; an objective lens for collecting light from the specimen mounted on the stage; a Z-axis movement section for relatively moving the stage and the objective lens in a direction along an optical axis of the objective lens; an XY-axis movement section for moving the stage in a direction orthogonal to the optical axis; an image acquisition unit for acquiring a color image by capturing the light collected by the objective lens; and a depth-extension processing unit for generating a depth-extended image by performing depth extension processing dye by dye on the basis of a plurality of the color images that are acquired by the image acquisition unit at different positions of the stage relative to the objective lens set with the Z-axis movement section.

In addition, another aspect of the present invention provides a microscope system including: a stage on which a multi-dyed specimen is mounted; an objective lens for collecting light from the specimen mounted on the stage; a Z-position operating section for changing the relative position of the stage and the objective lens in a direction along an optical axis of the objective lens; an XY-position operating section for changing the position of the stage in a direction orthogonal to the optical axis; an image acquisition unit for acquiring a color image by capturing the light collected by the objective lens; and a hardware processor, wherein the processor is configured to generate a depth-extended image by performing depth extension processing dye by dye on the basis of a plurality of the color images that are acquired by the image acquisition unit at different positions of the stage relative to the objective lens set with the Z-axis movement section.

DESCRIPTION OF EMBODIMENTS

A microscope system 100 according to one embodiment of the present invention will now be described with reference to the drawings.

Figure 1:
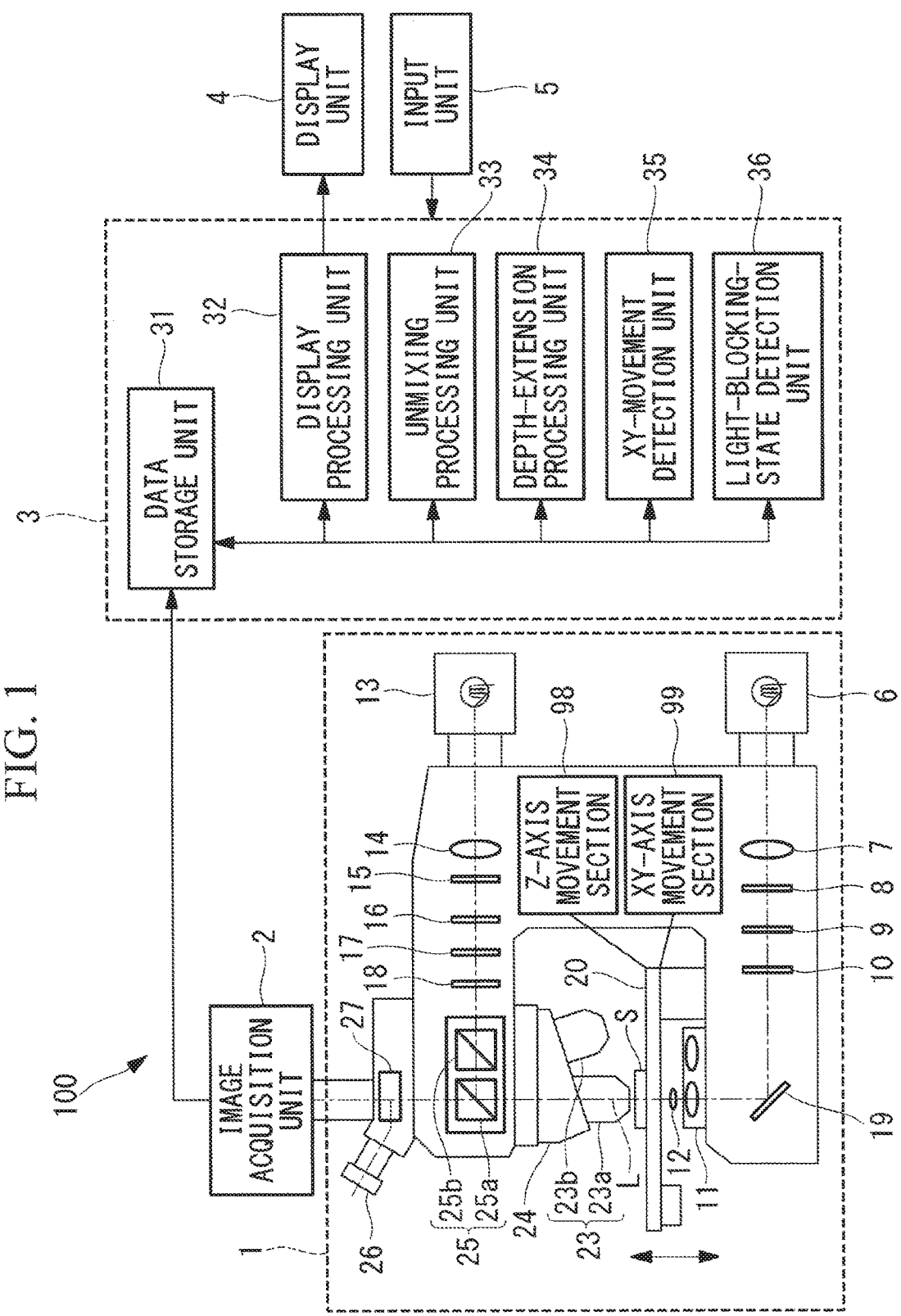
FIG. 1 is an overall configuration diagram showing a microscope system according to one embodiment of the present invention.

As shown in FIG. 1, the microscope system 100 according to this embodiment includes: a microscope main body 1; an image acquisition unit 2; an image processing unit 3; a display unit (image display unit, pixel-number display unit, and passage display unit) 4; and an input unit (display-condition setting unit) 5.

The microscope main body 1 includes, as a transmission-observation optical system: a transillumination light source 6; a collector lens 7 for collecting illumination light of this transillumination light source 6; a transmission filter unit 8; a transmission field stop 9; a transmission aperture stop 10; a condenser optical element unit 11; and a top lens unit 12. In addition, the microscope main body 1 includes, as an epi-illumination observation optical system: an epi-illumination light source 13; a collector lens 14; an epi-illumination filter unit 15; an epi-illumination shutter 16; an epi-illumination field stop 17; and an epi-illumination aperture stop 18. In the figure, reference sign 19 denotes a mirror.

Furthermore, in an observation optical path, there are: a revolver 24 that is revolved to select an objective lens 23 to be used for observation at a relevant time from among a plurality of mounted objective lenses 23$a$, 23$b$, . . . (hereinafter, also referred to as the objective lens 23); optical cubes 25$a$, 25$b$, . . . (hereinafter, also referred to as an optical cube 25) to be selectively placed into the observation optical path according to the spectral band characteristics of the microscope image of a specimen S that is made incident upon the image acquisition unit 2; and a beam splitter 27 for splitting the observation optical path into a path towards an eyepiece 26 and a path towards the image acquisition unit 2.

A stage 20 on which the multi-dyed specimen S is placed and that is movable in a direction (Z-axis direction) parallel to an optical axis L of the objective lens 23 selected with the revolver 24 and in a direction (XY-axis direction) orthogonal to the optical axis L is provided in the observation optical path where the optical path of the transmission-observation optical system and the optical path of the epi-illumination observation optical system overlap each other. This stage 20 is moved by an observer operating an operating handle composed of a Z-axis movement section 98 and an XY-axis movement section 99.

The image acquisition unit 2, including an image capturing element such as a CCD or a CMOS device for forming a specimen image, successively acquires frame images (color images) at a predetermined frame rate and sends them to the image processing unit 3.

The image processing unit 3 is, for example, a general-purpose personal computer, a workstation, or a computer using an built-in processor, a field programmable gate array (FPGA), a digital signal processor (DSP), a general purpose computing on graphics processing unit (GPGPU), and so forth.

The image processing unit 3 includes: a data storage unit (image storage unit) 31 for time-sequentially storing frame images sent from the image acquisition unit 2; a display processing unit (image playback unit) 32; an unmixing processing unit 33; a depth-extension processing unit 34; an XY-movement detection unit (XY-position detection unit and displacement calculation unit) 35; and a light-blocking-state detection unit (light-blocking detection unit) 36.

In the image processing unit 3, the following processing is performed each time a frame image sent from the image acquisition unit 2 is input.

First, in the unmixing processing unit 33, images classified by dye component applied to the specimen S (hereinafter, referred to as unmixing images) are generated from a frame image.

In addition, in the XY-movement detection unit 35, the observer's operation of moving the field of view (XY-axis movement) is detected, and motion vector information is generated.

In the depth-extension processing unit 34, a depth-extended image, in which the depth of field is extended by extracting an in-focus pixel, is generated from a frame image. It is preferable that pixel-by-pixel depth information in the depth-extended image generated by the depth-extension processing unit 34 be updated with the pixel-by-pixel depth information of a newly acquired frame image.

In particular, in this embodiment, depth extension processing is performed to generate a depth-extended image for each unmixing image generated as a result of unmixing processing by the unmixing processing unit 33.

In the light-blocking-state detection unit 36, the luminance of a frame image is detected to determine a light blocking state that is changed by moving the epi-illumination shutter 16 into/out of (IN/OUT) the observation optical path.

The data storage unit 31 is an arbitrary storage device, such as a memory, an HDD, or an SDD, and stores a frame image sent from the image acquisition unit 2 and also stores: a depth-extended image generated by the depth-extension processing unit 34; image data, such as an unmixing image generated by the unmixing processing unit 33; motion vector information detected by the XY-movement detection unit 35; and detection data, such as light blocking information detected by the light-blocking-state detection unit 36, and so forth.

In addition, in the data storage unit 31, image files that are assigned serial numbers in the reception order or multi-page TIFF image files are saved for the purpose of recording, playback, observation of frame images received at a predetermined frame rate.

Furthermore, the image processing unit 3 includes: an updated-pixel-number detection unit (not shown in the figure) for detecting the number of pixels the depth information of which in a frame image acquired by the image acquisition unit 2 is updated; an updated-pixel-number determination unit (not shown in the figure) for determining whether or not the number of pixels detected by this updated-pixel-number detection unit is equal to or smaller than a predetermined threshold value; and a region-of-interest setting unit (not shown in the figure) for setting the region of interest in each of the frame images stored in the data storage unit 31.

The input unit 5 is an arbitrary input unit, such as a keyboard and a mouse, and allows the observer to input display conditions (settings).

The display processing unit 32 outputs image data, such as a frame image and a depth-extended image stored in the data storage unit 31, to the display unit 4 according to the display conditions input in the input unit 5.

The operation of the microscope system 100 according to this embodiment with the above-described structure will be described below.

Figure 3:
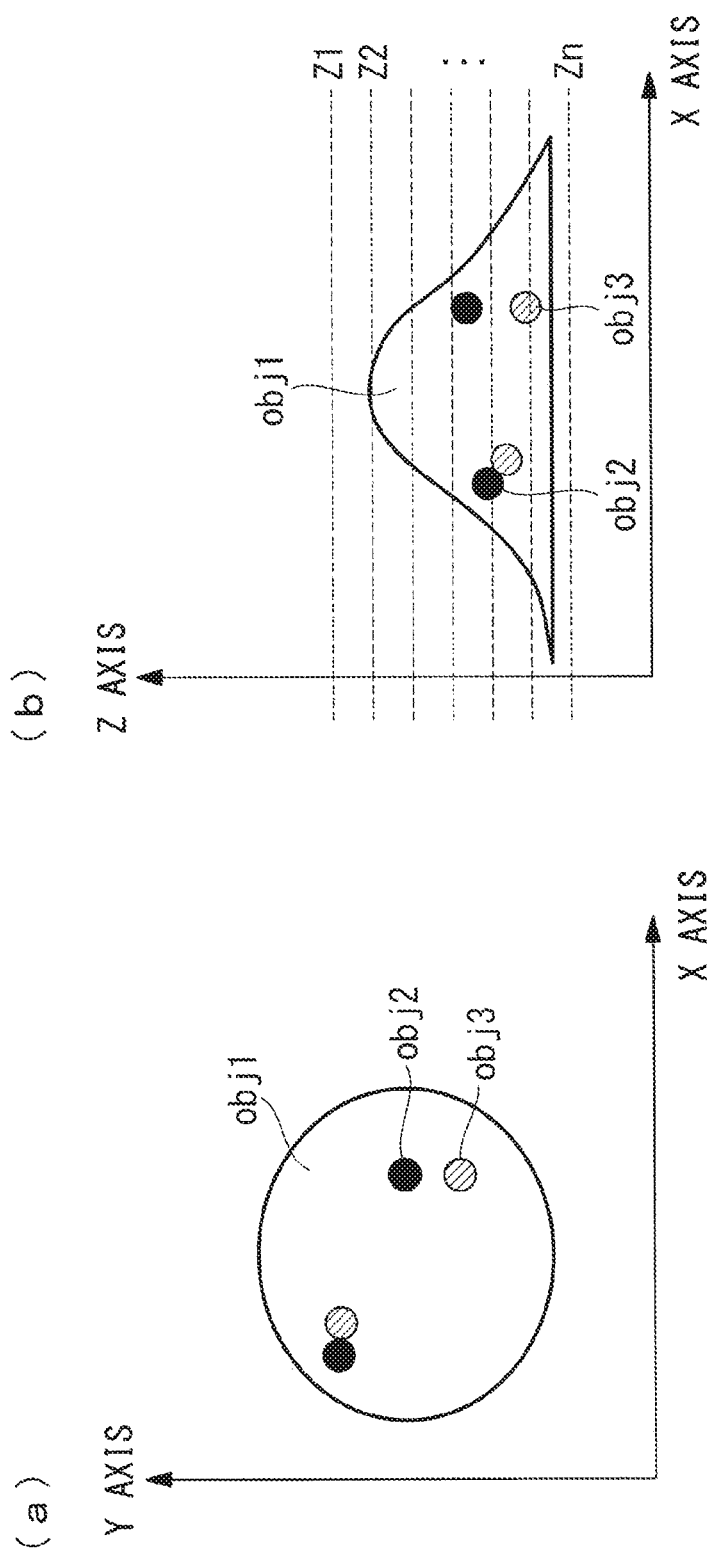
FIGS. 3($a$) and 3($b$) are a schematic plan view and a side elevational view, respectively, showing one example of a specimen.
Figure 4:
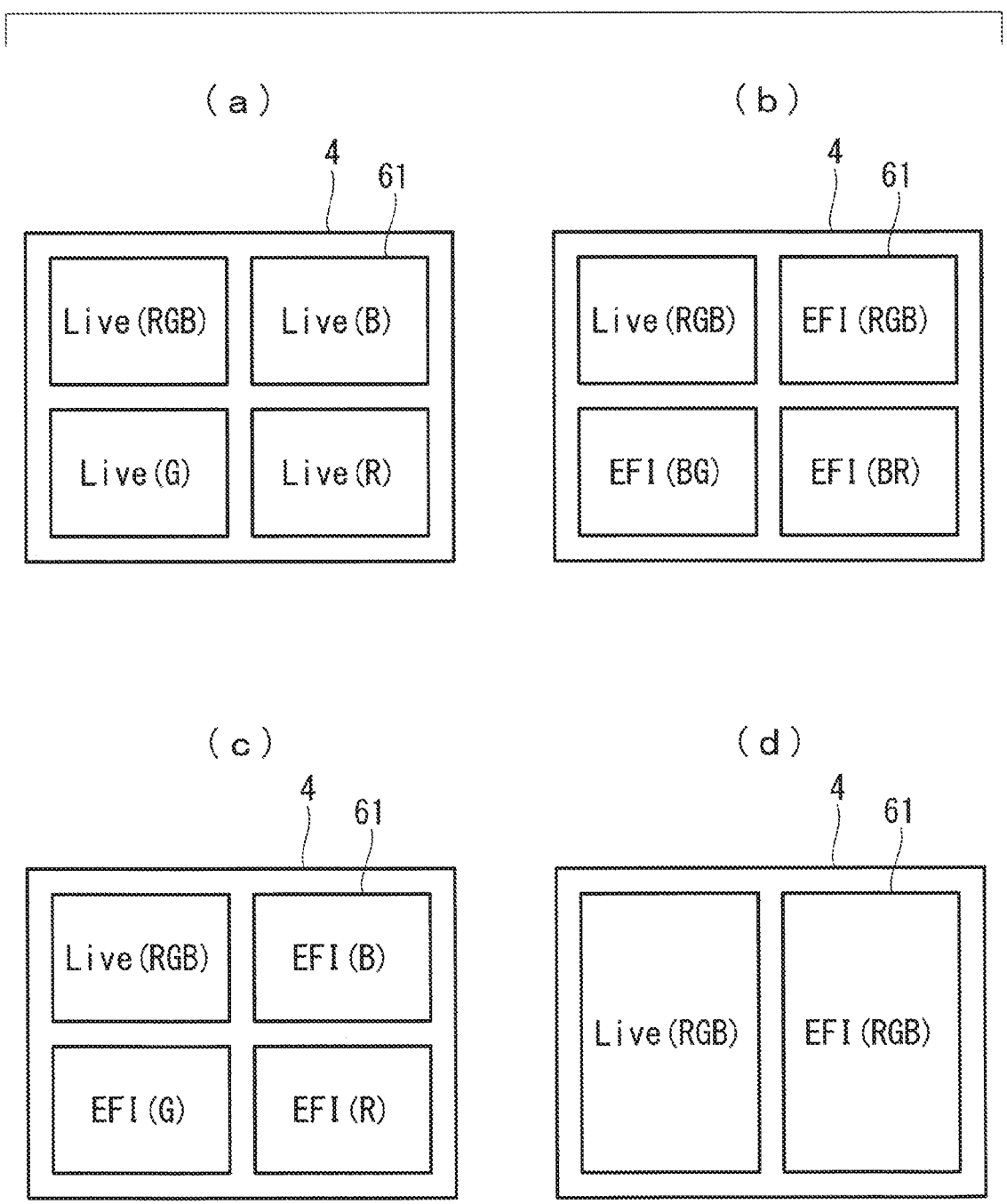
FIGS. 4($a$) to 4($d$) are diagrams depicting examples of a display layout of a dynamic image and a depth-extended image.

The following description assumes that a FISH specimen for detecting a fused gene mutation is used as the specimen S and that a fluorescence image of the multiply fluorescence-labeled specimen S is observed. More specifically, as shown in FIGS. 3(a) and 3(b), the cell nucleus is labeled in blue (B) with the DAPI dye (obj1), and FISH signals are labeled in two colors: green (G) with the FITC dye (obj2) and red (R) with the Texas Red dye (obj3).

In addition, in the image acquisition unit 2, specimen images are acquired in a state where the exposure time is adjusted to a fixed exposure condition that results in an exposure time of 100 ms or less (frame rate of 10 frames/s or more) so as to be suitable for the observation of a dynamic image of the specimen S, and each time an image is acquired, the acquired frame image is sent to the image processing unit 3.

Figure 2:
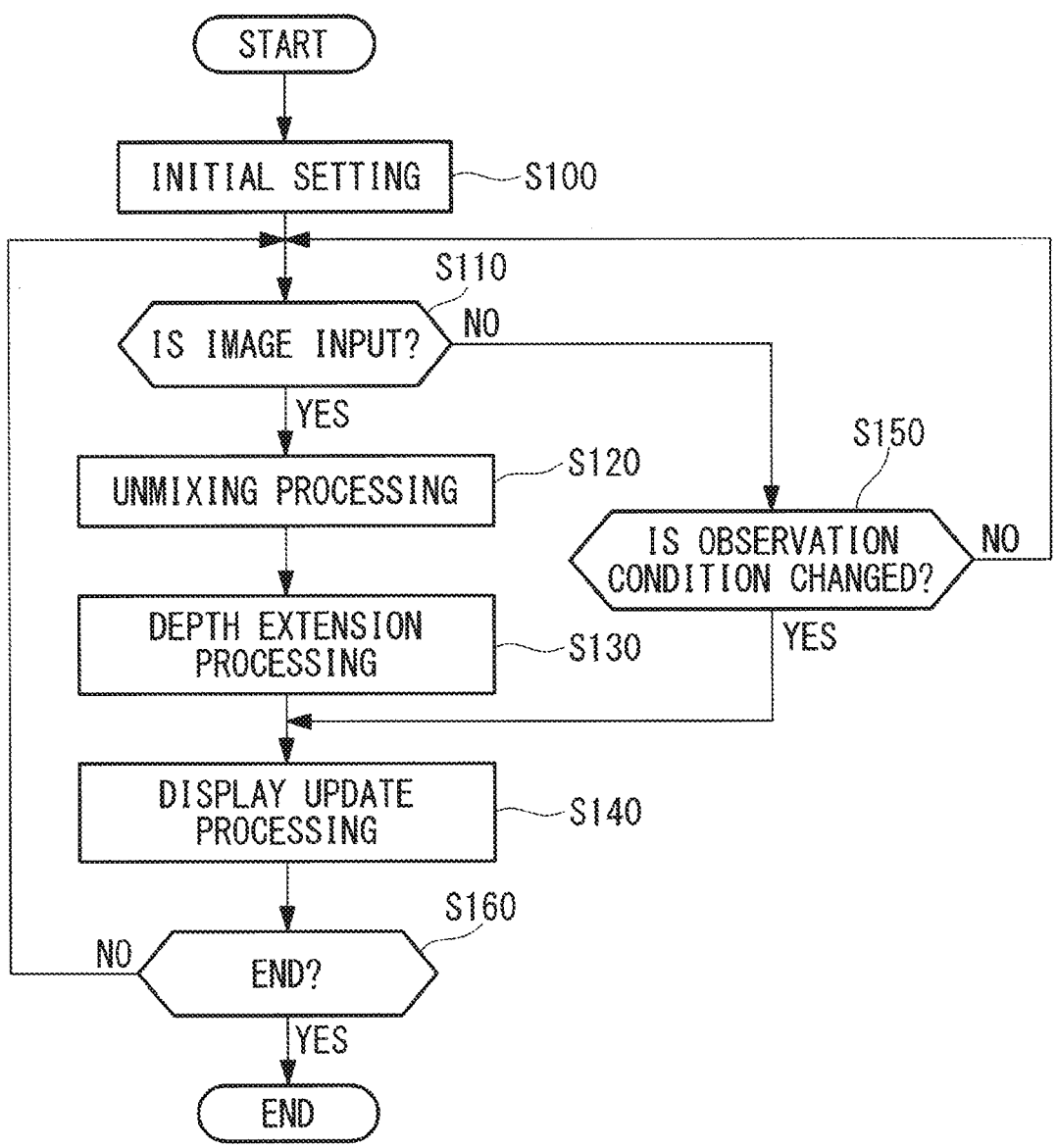
FIG. 2 is a flowchart for illustrating the operation of the microscope system in FIG. 1.

First, as shown in FIG. 2, the microscope main body 1 is prepared for observation, and an initial parameter setting process required for observation conditions is performed in step S100.

Figure 5:
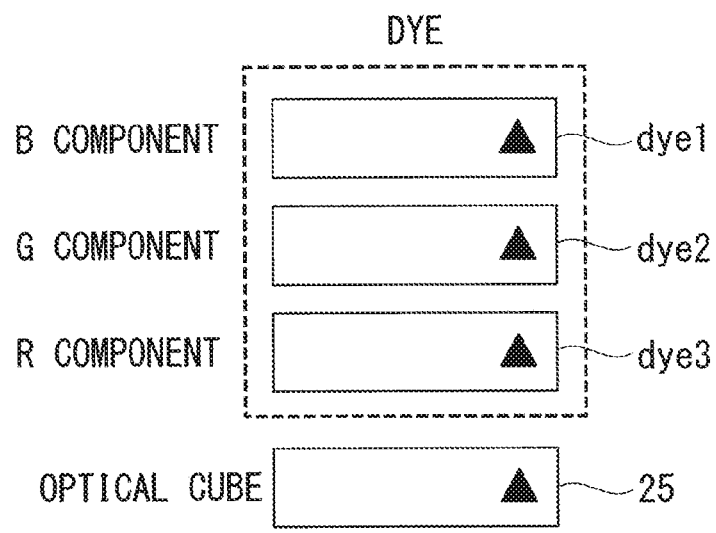
FIG. 5 is a diagram depicting a screen example for inputting initial settings.

The initial parameter setting process is performed, for example, by the observer operating the setting screen illustrated in FIG. 5 with the input unit 5. First, the fluorescent dyes applied to the specimen S are assigned to the color components to be observed.

In this embodiment, the DAPI dye (dye1) is specified as dye 1 for the B component (color1), the FITC dye (dye2) is specified as dye 2 for the G component (color2), and the Texas Red (dye3) is specified as dye 3 for the R component (color3). Thereafter, the optical cube 25 used for fluorescence observation is specified. In this embodiment, an optical cube that allows three bands of fluorescence including the above-described dyes 1, 2, and 3 to be observed (e.g., U-DM3-DA/FI/TX manufactured by Olympus) is selected.

As illustrated in FIGS. 4(a) to 4(d), a display combination mode indicating how a dynamic image (denoted as Live in the figure) and a depth-extended image (denoted as EFI in the figure) should be combined for observation is specified.

This completes the initial setting process. In order to proceed to fluorescence observation with the microscope main body 1, the objective lens 23 having the desired magnification and the optical cube 25 specified in the initial setting process are selectively moved into the optical path, the epi-illumination light source 13 is turned on, and the epi-illumination shutter 16 is moved out of the optical path, thereby starting color fluorescence observation.

Thereafter, in the image processing unit 3, it is determined whether or not a frame image has been received (image input) in the data storage unit 31 from the image acquisition unit 2 (step S110). If a frame image has been received, the frame image is stored in the data storage unit 31. Regarding the received frame image, the current frame image that has been received and that has been stored in the data storage unit 31 is converted into unmixing images, classified by fluorescent dye component, using well-known unmixing processing in the unmixing processing unit 33 (step S120).

The generated unmixing images are also stored in the data storage unit 31.

An overview of the unmixing processing will be described below.

The fluorescence from the specimen S is imaged as a result of being incident upon the image capturing element via an absorption filter in the optical cube 25 and via a color filter in the image acquisition unit 2. A pixel value of the image acquired by the image acquisition unit 2 is represented by Expression (1).

{Expression 1}

$$\begin{pmatrix} R \\ G \\ B \end{pmatrix} = \begin{pmatrix} \int f1(\lambda)e(\lambda)cR(\lambda)d\lambda & \int f2(\lambda)e(\lambda)cR(\lambda)d\lambda & \int f3(\lambda)e(\lambda)cR(\lambda)d\lambda \\ \int f1(\lambda)e(\lambda)cG(\lambda)d\lambda & \int f2(\lambda)e(\lambda)cG(\lambda)d\lambda & \int f3(\lambda)e(\lambda)cG(\lambda)d\lambda \\ \int f1(\lambda)e(\lambda)cB(\lambda)d\lambda & \int f2(\lambda)e(\lambda)cB(\lambda)d\lambda & \int f3(\lambda)e(\lambda)cB(\lambda)d\lambda \end{pmatrix} \begin{pmatrix} a1 \\ a2 \\ a3 \end{pmatrix} \quad (1)$$

Here, $\lambda$ is the wavelength; R, G, and B are the luminance values at the image acquisition unit 2; $f1(\lambda)$, $f2(\lambda)$, and $f3(\lambda)$ are normalized fluorescence spectra; $e(\lambda)$ is the transmittance of the absorption filter; $cR(\lambda)$, $cG(\lambda)$, and $cB(\lambda)$ are the spectral sensitivities of the image acquisition unit 2; and a1, a2, and a3 are the proportions of the fluorescence spectra.

The proportions of the fluorescence spectra indicate the proportions of three colors, i.e., the amounts of fluorescent dyes (hereinafter, also referred to as the amounts of fluorescent dyes, a1, a2, and a3), of the fluorescence existing at a pixel of interest. Therefore, a difference in fluorescent dye can be identified as a difference in color by assigning the proportions of the fluorescence spectra to the respective RGB components of an image.

Expression (1) can be modified into Expression (2) below, and multiplying the inverse matrix $M^{-1}$ of a matrix M in Expression (2) by the sent frame image can produce the amounts of fluorescent dyes at each of the pixels.

{Expression 2}

$$\begin{pmatrix} R \\ G \\ B \end{pmatrix} = M \begin{pmatrix} a1 \\ a2 \\ a3 \end{pmatrix} \quad M^{-1} \begin{pmatrix} R \\ G \\ B \end{pmatrix} \begin{pmatrix} a1 \\ a2 \\ a3 \end{pmatrix} \quad (2)$$

Because the fluorescent dyes applied to the specimen S and information about the optical cube 25 used for observation are known in step S100, the matrix M can be obtained on the basis of information about the fluorescent dyes, the optical cube 25, and the spectrum definition of the image acquisition unit 2 pre-recorded in the data storage unit 31.

Therefore, the specimen image that has been input from the image acquisition unit 2 can be decomposed into the amounts of fluorescent dyes a1, a2, and a3, and information about the fluorescent dyes can be recognized as color (RGB) information by re-assigning the amounts of fluorescent dyes a1, a2, and a3 to the RGB components of the image.

In this embodiment, performing the above-described unmixing processing allows DAPI to be assigned to the B component and observed in blue, FITC to be assigned to the G component and observed in green, and Texas Red to be assigned to the R component and observed in red, except for a case where the dye of interest is influenced by another dye due to cross-talk.

It is needless to say that the observer can obtain an inverse matrix by specifying a region in an image colored with a single dye.

Thereafter, when the updated-pixel-number determination unit determines that the number of pixels detected by the updated-pixel-number detection unit exceeds the predetermined threshold value, a depth-extended image in which the depth of field is extended can be generated by the depth-extension processing unit 34 in step S130 by extracting in-focus pixels for each dye using the unmixing images generated in step S120, and the generated depth-extended images are updated and stored in the data storage unit 31. In addition, when it is determined that the number of pixels the depth information of which is updated is equal to or smaller than the predetermined threshold value, the generated depth-extended image is not stored in the data storage unit 31.

Because no depth-extended images for comparison of the in-focus state exist when the first image is input, unmixing images themselves are generated as depth-extended images. When the second and subsequent images are input, the in-focus state is compared for each pixel on a dye-by-dye basis between the unmixing image and the depth-extended image, and the pixel values of the depth-extended images are updated with pixel values having a high in-focus evaluation score (focused pixel).

As the in-focus evaluation method, it is possible to employ a well-known method in which a differential luminance value at each pixel with respect to a nearby pixel in an image is calculated, and this differential value is used as the evaluation score. This evaluation score is stored in the data storage unit 31 as an in-focus evaluation score image in the same format as that of a depth-extended image. Regarding the pixel of interest, an evaluation score V1 of the unmixing image is compared with an evaluation score V2 of the in-focus evaluation score image, and if V1>V2, then the depth-extended image data and the in-focus evaluation score image data at the pixel of interest are updated. Thereafter, the total value of the number of pixels that have been subjected to a depth extension process is stored in the data storage unit 31 for each color component. As a differential filter, the well-known Sobel filter and Laplacian filter can be used.

Thereafter, in step S140, unmixing images and depth-extended images that are updated each time a frame image is sent are output to and displayed on the display unit 4 by the display processing unit 32 in one of the formats shown in FIGS. 4(a) to 4(d) according to the display combination mode specified in step S100. Thereafter, it is determined whether or not the processing ends, and in a case where the processing continues, the steps from step S110 are executed again (step S160).

Furthermore, the MIN luminance value and the MAX luminance value are obtained for each dye component from the depth-extended images, thereby optimizing the tone curves.

For the optimization method, the output range may be maximized in a state where the above-described MIN and MAX pixel values serve as an input range, or alternatively the optimization method may be determined via an operation (not shown in the figure) of the observer. Furthermore, because the cell nucleus labeled with DAPI serves as a landmark and hence it suffices so long as it can be checked whether or not a FISH signal exists in the cell nucleus, only DAPI may be automatically adjusted to a slightly dark tone curve. In short, the optimization method may be modified as long as the modification does not deviate from the gist of the present invention.

In addition, when the observer performs a panning operation and a magnification/reduction display operation (not shown in the figure), the image windows 61 in the display unit 4 shown in FIGS. 4(a) to 4(d) are subjected to synchronous display control so as to have the same display magnification and display position as one another. Therefore, a three-dimensional evaluation of the cell of interest become possible in such a manner as to evaluate a localization relationship of the XY coordinates on the depth-extended image and a localization relationship in the Z direction on the unmixing image, thus making it possible to easily determine whether or not the FISH signal is split (i.e., whether the cell is a fused gene mutation or a normal gene).

Furthermore, in the display mode shown in FIG. 4(a), information about localization of each of the fluorescent dyes can be observed live in real time without being affected by the brightness of the cell nucleus (DAPI). In the display mode shown in FIG. 4(b), the FISH signals in the cell nucleus can be observed individually, making it possible to clearly check whether each of the signals exists.

In addition, in FIG. 4(c), it can be checked whether or not each of the FISH signals exists without being affected by the brightness of the cell nucleus, and in FIG. 4(d), a Live image and a depth-extended image can be checked in synchronization with each other in the widest possible field of view. More specifically, the multi-labeled specimen S can be observed at a viewpoint desired by the observer.

Furthermore, the calculated number of pixels for each dye, which have subjected to the depth extension process in step 130, is displayed on the display unit 4. If the number of pixels does not exceed a predetermined threshold value (is equal to or smaller than the predetermined threshold value) within a predetermined time period (or predetermined number of frames), it is determined that an omnifocal image has been built, and a warning sound is issued or a warning indication is displayed by an alarm unit (not shown in the figure). By doing so, not only can the observer easily determine whether or not an additional Z-axis movement operation is necessary but also color fading can be suppressed by preventing radiation of unnecessary excitation light.

In a case where no frame image is sent, it is determined whether or not the operation of changing the display combination mode or the operation of magnifying/reducing or panning the image window 61 by manipulating, for example, the input unit 5 has been accepted (step S150). If the observation conditions are to be changed, display update processing according to the details of the operation is performed by the display update processing in step S140. If the observation conditions are not changed, the steps from step S110 are executed again.

In this manner, the microscope system 100 according to this embodiment affords an advantage in that, because depth extension processing is performed for each dye and depth-extended images are generated in the depth-extension processing unit 34, the depth-extended images can be clearly observed without missing a weak, slight labelling signal coming from the multi-stained specimen S. In addition, information about localization (XYZ) of a labeled site can be easily confirmed by displaying a Live image and a depth-extended image side by side in synchronization with each other. In particular, a multi-labeled fluorescence specimen affords an advantage in that observation as described above is possible while preventing color fading.

Figure 6:
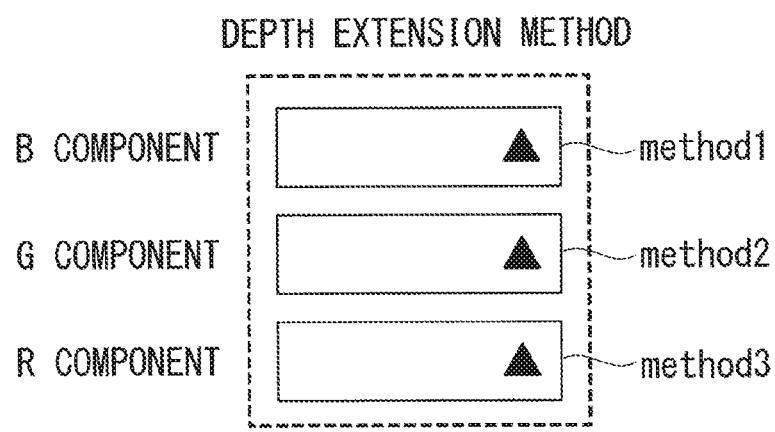
FIG. 6 is a diagram depicting a display example for setting a depth extension method.

A case where a different depth extension method is employed for each dye in the depth-extension processing unit 34 will now be described with reference to FIG. 6.

This is realized by, for example, the observer selecting a depth extension method (method 1, 2, or 3) prepared for each of the color components to be observed (i.e., dyes 1, 2, and 3) in the input unit 5. More specifically, a depth extension method for each of the color components to be observed is specified in the initial setting process in step S100 of FIG. 2, and depth extension is performed by the method specified for each dye in the depth extension process in step S130.

The depth extension method is roughly classified into two types: one type of method for performing depth extension on a pixel-by-pixel basis; and another type of method which is an in-focus surface selection (depth extension omission) method for employing, as the depth-extended image, the in-focus surface having the highest in-focus evaluation score of the entire image.

For the method for performing depth extension on a pixel-by-pixel basis, it is possible to select a method in which differential information, dispersion information, or various items of contrast evaluation information are used on the basis of a region neighboring the pixel of interest, as well as a method in which the maximum luminance value or the minimum luminance value of the pixel of interest is employed as the in-focus evaluation score. For the in-focus surface selection method, it is possible to select a method in which all-pixel-addition information of differential information, the dispersion value of the entire screen, spatial frequency information, and so forth are used as the in-focus evaluation score.

In this embodiment, it is preferable that, for example, the in-focus surface selection method (dispersion value of the entire screen) be selected for the DAPI dye (B component) and that the depth extension method (maximum luminance value) be selected for the FISH signals (G and R components).

More specifically, because the cell nucleus (DAPI dye) in the FISH specimen serves as something like a landmark, it suffices so long as it can be determined whether or not an FISH signal exists in the cell nucleus. Therefore, simplified processing in which, for example, an image having a Z-coordinate with the highest in-focus evaluation score is substituted as an omnifocal image is acceptable. Because this reduces the processing time, it provides an advantage in that the operability can be enhanced.

In addition, because a FISH signal is a weak signal existing in the cell nucleus, it is displayed in a size of several pixels with an objective lens having a relatively low magnification, such as 10× or 20×, that is used to search for a site of interest. This leads to a problem in that a FISH signal cannot be discriminated from noise in some cases if, for example, the depth extension method (differential information method) is employed. In order to confirm whether or not a FISH signal exists, a method in which a luminance value is used as the in-focus evaluation score and the pixel with the maximum luminance value is extracted is preferable.

In this manner, in the above-described embodiment, the observer can select a depth extension method suitable for each labeled site according to various conditions including the purpose of observation, such as landmark/signal, morphological characteristics of the labeled site, and the observation magnification, thereby enhancing the visibility when the specimen is observed.

Figure 7:
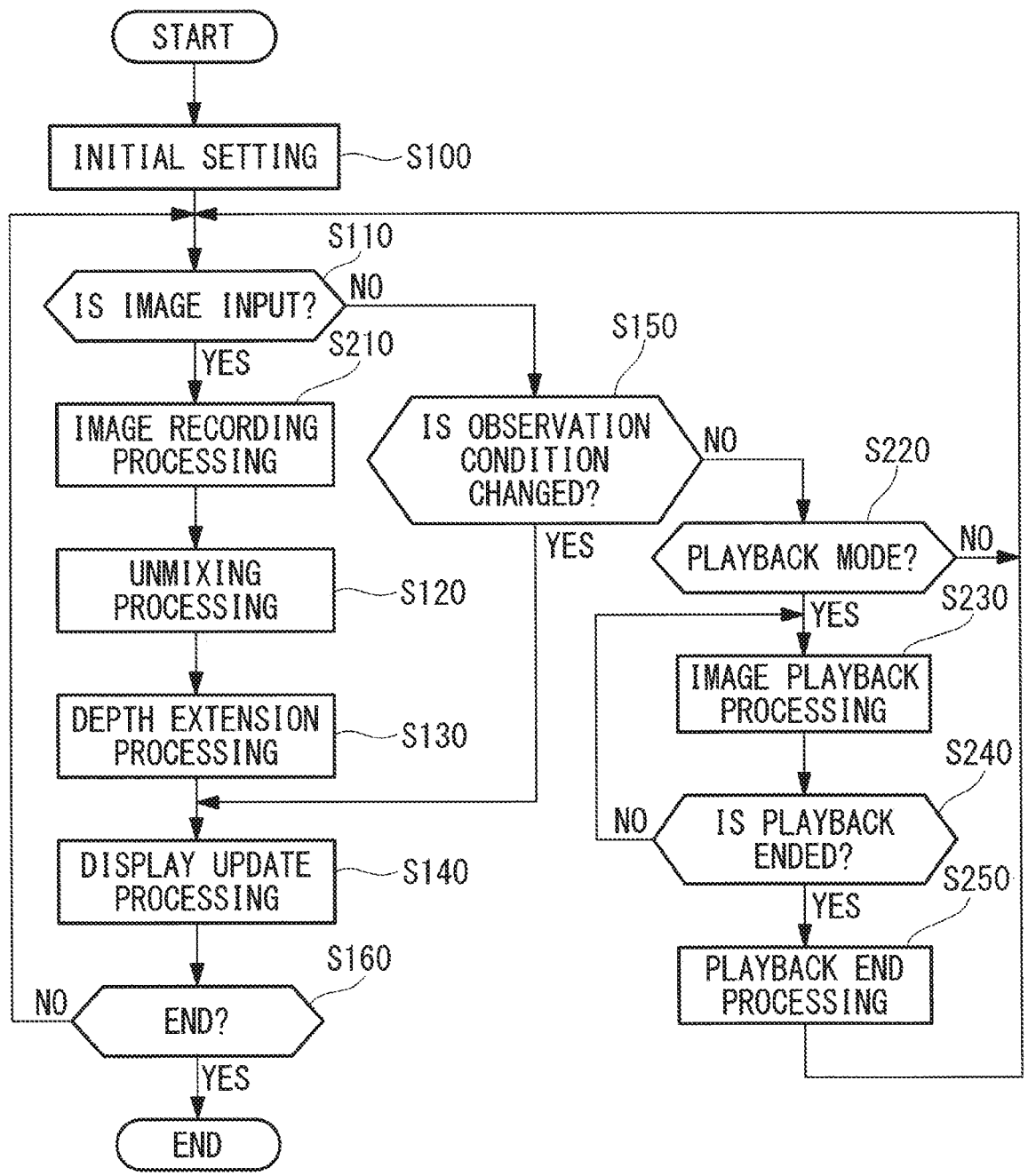
FIG. 7 is a flowchart for illustrating the operation of a modification of the microscope system in FIG. 1.

In addition, as shown in FIG. 7, when frame images are sent from the image acquisition unit 2, the sent images may be stored in the data storage unit 31 in the format of image files assigned serial numbers in the reception order or a multi-page TIFF image file for the purpose of recording/playback and observation (step S210).

For example, when an instruction for switching to the playback mode is given via an operation in the input unit 5 (step S220) without changing the observation conditions in step S150, the images stored in step S210 are played back until the end of playback is determined (steps S230 and S240).

The determination as to whether or not playback is ended may be made, for example, on the basis of an instruction for ending the playback mode (instruction for switching the observation of the specimen image) given via the operation of the input unit 5, or alternatively, the end of the playback mode may be determined by detecting the release of the light blocking state (radiation of excitation light or movement of the epi-illumination shutter 16 out of the optical path) using a light-blocking state determination method (light-blocking-state detection unit 36 or position sensor), which will be described later.

When the playback mode ends, processing for ending playback is executed in step S250, and after the end of the processing for ending playback, the steps from step S110 are executed again.

For example, the process of resetting the depth-extended images generated in step S130 and the process of deleting the recorded image files that have been played back and observed are performed. It is needless to say that depth-extended images having different fields of observation view (XY coordinates) can be played back and observed by recording/saving recorded image files as separate files and deleting the recorded image files starting with the oldest recorded image file when a predetermined storage capacity is exceeded.

In addition, instead of playing back images stored in the data storage unit 31 via an operation in the input unit 5, a luminance value detection unit for detecting the luminance value of each color-component image of the acquired unmixing images may be provided, and the light-blocking-state detection unit 36 determines that light is blocked when the maximum luminance value of each color-component image of the unmixing images is equal to or smaller than a predetermined threshold value, and then, the playback mode, in which the XY position is not detected, may be selected when the light blocking state continues for a predetermined time period (or predetermined number of frames).

Furthermore, the epi-illumination shutter 16 may be configured so as to have a position sensor, and the image processing unit 3 to allowed recognize the state of this position sensor, thus switching to the playback mode via the operation of moving the epi-illumination shutter 16 into the optical path.

Here, image recording/playback will be described.

Figure 8:
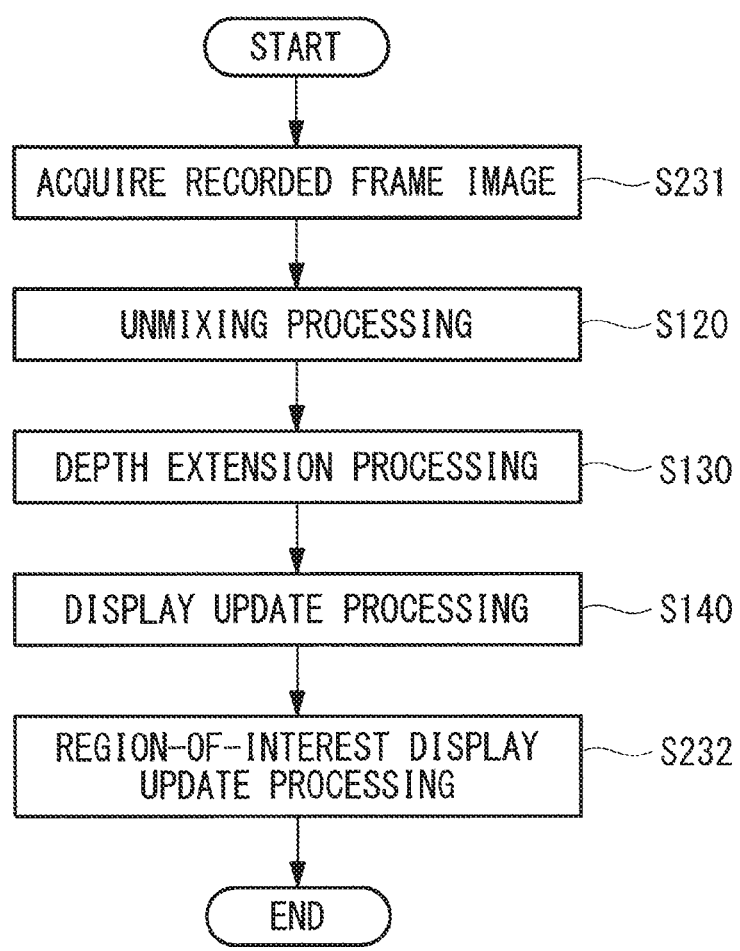
FIG. 8 is a flowchart showing a playback example of record frame images.

First, as shown in FIG. 8, in step S231, a relevant frame image (recorded frame image) is read out from among the recorded image files stored in the data storage unit 31 in time-sequential order. More specifically, when the playback mode is entered in step S220 of FIG. 7, the frame counter is initialized, and loop playback is performed, in which the frame counter is incremented each time the relevant frame image is read out in this processing, and the process returns to the head frame when the last frame is reached.

It is needless to say that the frame rate received from the image acquisition unit 2 is set as the initial value of the read-out interval, the read-out interval can be changed by the observer to an arbitrary read-out interval, and pause, frame-by-frame advance, and backward playback are possible.

From steps S120 to S140, processes the same as those in the observation flow in FIG. 2 are performed, making it possible to play back and observe an unmixing image (Live image) and a depth-extended image (EFI image) in the same manner as in specimen observation.

Figure 10:
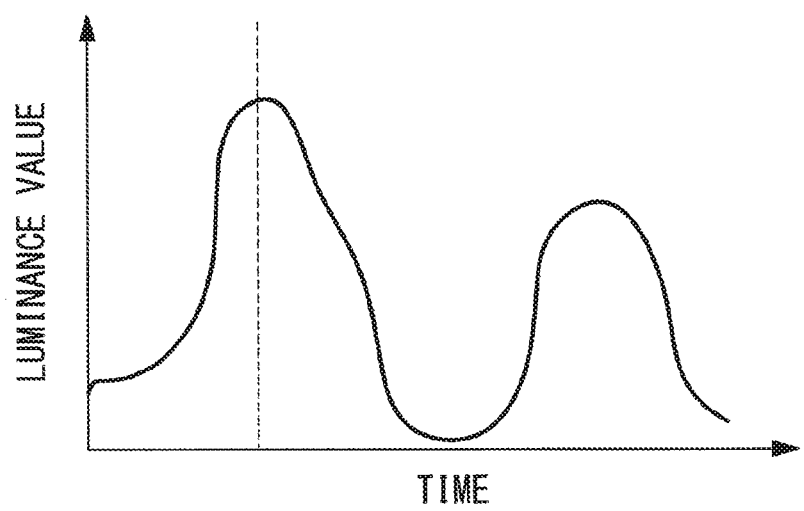
FIG. 10 is a diagram depicting a display example of a luminance change in a region of interest.

After the display update process in step S140 is executed, luminance information in the region of interest is displayed in the form of a time-lapse graph, as shown in FIG. 10, in the region-of-interest display-update processing in step S232 executed by the region-of-interest setting unit. More specifically, the observer specifies a region of interest on the specimen image displayed in an image window 61 of FIG. 4 with a rectangular region, for example, by a mouse operation on the input unit 5, and luminance information in the specified rectangular region is drawn as a luminance curve on the display unit 4.

Thus, luminance change information in the region of interest can be confirmed while playing back and observing the unmixing image (Live image) and the depth-extended image (EFI image). Therefore, when the observer repeats movement observation in the thickness direction (Z-axis direction) of the specimen S, the observer can confirm how fluorescence color fading occurs on the playback image. This function can be used to, for example, adjust the illumination intensity of excitation light and determine the observation time in the thickness direction, making it possible to perform fluoroscopy with color fading being suppressed.

Figure 9:
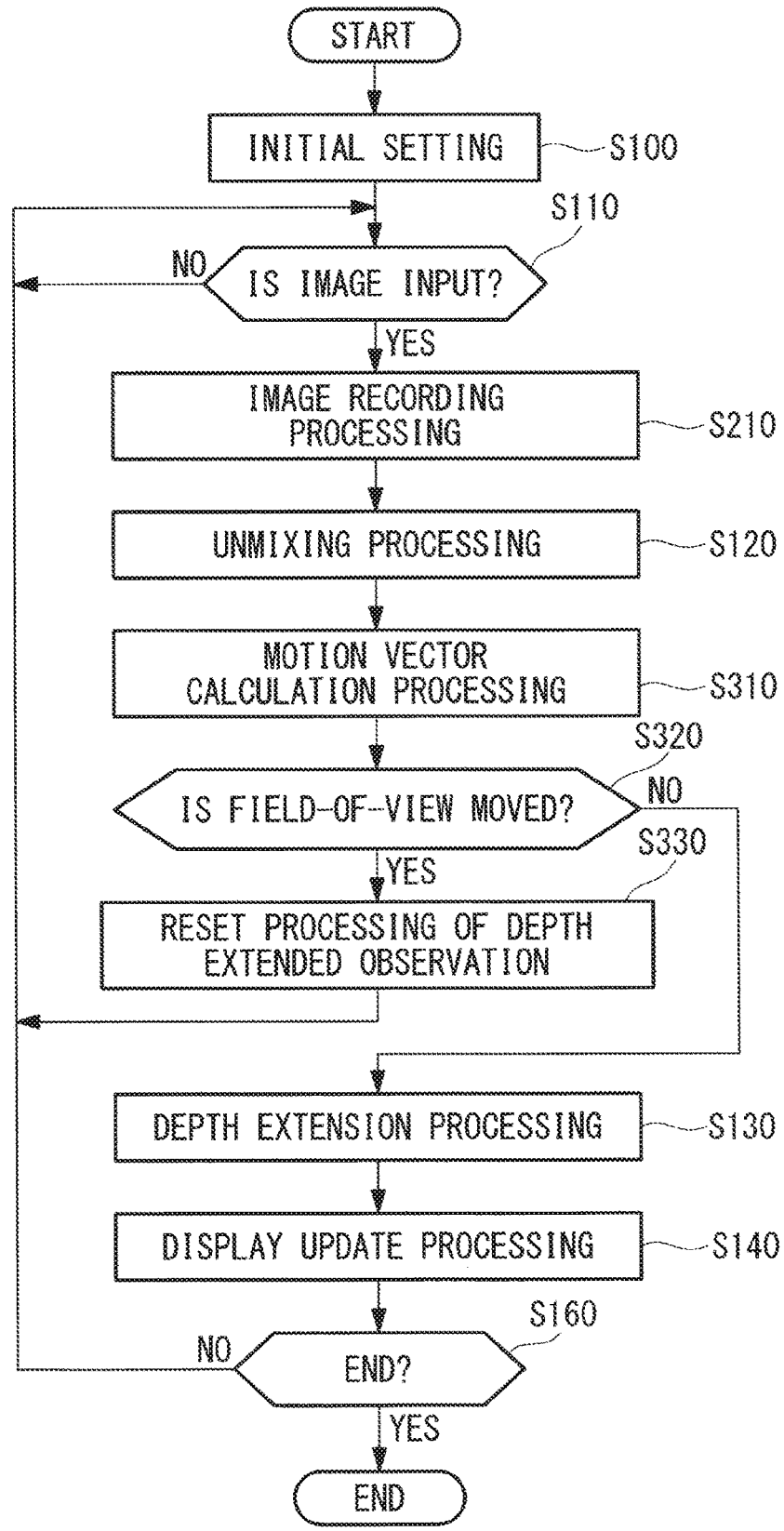
FIG. 9 is a flowchart for illustrating the operation of another modification of the microscope system in FIG. 1.

A case where the XY position is changed between frame images used for depth extension processing will be described below with reference to FIG. 9.

In step S310, the amount of motion vector (difference) in the XY direction is calculated with the XY-movement detection unit 35. The motion vector quantity can be derived by calculating a relative position displacement in the XY-axis direction on the image between two frame images that are adjacent in the time-axis direction stored in the data storage unit 31.

For the calculation of the motion vector quantity, a well-known technique, such as template matching represented by the Sum of Absolute Difference (SAD) and the Normalized Cross-Correlation (NCC) or the phase only correlation method based on spatial frequency, can be used. In the XY-movement detection unit 35, not only is a motion vector calculated but also the reliability of the calculation result is calculated. For the reliability, for example, the correlation coefficient of the NCC and the peak value of the phase only correlation method can be used and are stored in the data storage unit 31 as reliability information together with the motion vector quantity.

For example, the B component (DAPI-labeled cell nucleus) image of the unmixing images produced in step S120 is employed as an image for motion detection evaluation. This is because the FISH signal images (G and R components of the unmixing images) exhibit to a great change in luminance due to a movement operation in the Z-axis direction and are not suitable for XY-axis movement detection.

Next, it is evaluated whether or not the image is blurred due to, for example, movement of the field of view or vibration by using the calculated motion vector quantity and reliability information (step S320).

When the calculated motion vector quantity, a, is equal to or greater than a predetermined threshold value (first threshold value) a1 (a a1), it is determined that the observation field of view has moved as a result of the observer performing an XY-axis movement operation of the stage 20, depth extended observation is reset (step S330), and the steps from step S110 are executed again.

When the motion vector quantity, $\alpha$, is $\alpha < \alpha 1$, the cumulative motion vector quantity, $\Sigma \alpha$, which is cumulatively added and stored in the data storage unit 31 each time a frame image is input, is checked. As a result, when the cumulative motion vector quantity, $\Sigma \alpha$, is equal to or greater than a predetermined threshold value (second threshold value) $\alpha 2$ ($\Sigma \alpha \geq \alpha 2$), depth extended observation is reset (step S330), and the steps from step S110 are executed again.

In the other case, it is determined that the image is blurred due to, for example, vibration, subsequently proceeding to step S130, where the unmixing images are corrected for shift (regions with missing pixels are not subjected to depth extension) using the cumulative motion vector quantity, $\Sigma \alpha$, and depth extension processing is performed. Shift correction may be performed in a case where the motion vector quantity, $\alpha$, itself is $\alpha 2 \leq \alpha < \alpha 1$, instead of evaluating the cumulative motion vector quantity, $\Sigma \alpha$.

Note that the depth extension reset processing in step S330 includes resetting the depth-extended images generated in step S130, as triggered by field-of-view (XY-axis) movement, and initializing image data and control information as triggered by field-of-view movement, such as initialization of the cumulative motion vector quantity, $\Sigma \alpha$.

By doing so, dynamic image observation and depth extended observation of the specimen S can be performed without requiring an additional operating instruction in response to a field-of-view movement operation performed by the observer, thereby allowing the observer to focus on specimen observation.

In addition, when it is evaluated in step S320 that there is no image blurring due to, for example, movement of the field of view or vibration, the steps from step S130 in FIG. 2 are executed.

Furthermore, when the maximum luminance value of the image for motion detection evaluation is equal to or smaller than the predetermined threshold value in step S310, it may be determined that the light is blocked, and the depth-extended image may not be updated.

In addition, if the image for motion detection evaluation is in an out-of-focus state and is not suitable for motion detection, no motion detection may be performed but a motion vector may be calculated only after a proper contrast value has been detected.

In addition, if the reliability information about the motion vector quantity exhibits such a low-reliability state as to be equal to or smaller than a predetermined threshold value, no motion detection may be performed or it may be determined that the field of view has moved on the basis of a predetermined number of successive motion detections.

Furthermore, in this embodiment, a multi-dye specimen in a bright field may be used as the specimen S.

An example of the use of the specimen S can be seen in a case where a Dual Color in situ hybridization (DISH) specimen used in an HER2 gene amplification study of breast cancer is subjected to bright-field observation.

More specifically, a specimen in which the HER2 gene is dyed in blackish brown with silver particles, the centromere of the 17th chromosome is dyed in red with enzyme labelling, and the cell nucleus is dyed in violet with hematoxylin dye is used.

Note that in the case of a bright-field specimen, unlike a fluorescent specimen, if dyes are simply assigned to the R, G, and B components, the specimen image on the display unit 4 appears differently from the specimen observation image at the eyepiece 26. To overcome this problem, the amount of dye is obtained using the well-known Lambert-Beer law, a pixel exhibiting the maximum amount of dye is extracted as an in-focus image, and the obtained amount of dye is inverse-transformed into color information using the optical spectrum of the dye, thereby making it possible to perform depth extended observation with a display color the same as that of the image observed at the eyepiece 26. An overview will be described below.

First, in the initial setting process in step S100, silver particle is selected as dye 1, a peroxidase substrate is selected as dye 2 for red, hematoxylin is selected as dye 3, an empty cube for transmission bright-field observation is selected as the optical cube 25, and a display combination mode is specified. Thereafter, in order to perform transmission bright-field observation with the microscope main body 1, the objective lens 23 having a desired magnification and the optical cube 25 specified in the above-described setting processing are selectively moved into the optical path, and the transillumination light source 6 is illuminated, thus starting transmission bright-field observation.

Subsequently, in step S110, it is determined whether or not a frame image has been received from the image acquisition unit 2, and when a frame image has been received, the flow proceeds to step S120. In step S120, unmixing images are generated in the unmixing processing unit 33 and are converted into the amount of each dye. In the depth extension processing of step S130, the pixel having the maximum amount of dye is extracted, and depth-extended images with a widened depth of field are generated and are stored in the data storage unit 31.

Thereafter, in the process of step S140, the unmixing images and depth-extended images composed of the amounts of dyes are inverse-transformed into color information using the optical spectra of the dyes and are output to and displayed on the display unit 4.

By doing so, in the bright-field specimen that is multi-labeled with dyes having different wavelengths, dynamic image observation, as well as depth extended observation of a labeled site, can be performed.

Although this embodiment has been described by way of an example of a manual microscope, a microscope in which movement control in the Z-axis direction and/or XY-axis direction is motorized may be used. Furthermore, although this embodiment has been described by way of an example where the movement in the Z-axis direction is realized by controlling the movement of the stage 20, instead of this, the movement of the revolver 24 may be controlled.

Consequently, the following aspects are derived from the above-described embodiments.

One aspect of the present invention provides a microscope system including: a stage on which a multi-dyed specimen is mounted; an objective lens for collecting light from the specimen mounted on the stage; a Z-axis movement section for relatively moving the stage and the objective lens in a direction along an optical axis of the objective lens; an XY-axis movement section for moving the stage in a direction orthogonal to the optical axis; an image acquisition unit for acquiring a color image by capturing the light collected by the objective lens; and a depth-extension processing unit for generating a depth-extended image by performing depth extension processing dye by dye on the basis of a plurality of the color images that are acquired by the image acquisition unit at different positions of the stage relative to the objective lens set with the Z-axis movement section.

According to this aspect, the multi-dyed specimen is mounted on the stage, and when a plurality of color images that are made to have different focal positions in the optical-axis direction of the objective lens by relatively moving the stage and the objective lens are acquired by the image acquisition unit in a state where the optical axis of the objective lens is made to coincide with a predetermined position of the specimen by means of the XY-axis movement section, the depth extension processing unit applies depth extension processing to the color images on a dye-by-dye basis and generates a depth-extended image.

In this case, because depth extension processing is performed on a dye-by-dye basis, the in-focus position can be evaluated on a dye-by-dye basis, and weak light from a particular dye that is emitted from the specimen and that has different focal positions is prevented from becoming difficult to observe or missing due to mixing with light from another dye, thereby making it possible to acquire a clearly observable depth-extended image.

The above-described aspect may further include: an image display unit for displaying a dynamic image that time-sequentially updates the color image acquired by the image acquisition unit and the depth-extended image generated by the depth-extension processing unit in a simultaneous and synchronous manner.

By doing so, the dynamic image of color images acquired by the image acquisition unit and the depth-extended image are displayed on the image display unit in a simultaneous and synchronous manner. As a result, the positional relationship of the state of expression in a local region can be grasped from weak light, such as a FISH signal, coming from inside the cell, thereby making it possible to easily check for gene translocation etc.

In addition, in the above-described aspect, the depth-extension processing unit may generate the depth-extended image individually for a different combination of dyes, and the microscope system may include a display-condition setting unit for setting a display condition for combining the dynamic image and the depth-extended image displayed by the image display unit.

By doing so, as a result of depth extension processing, pseudo-color observation becomes possible using the depth-extended image generated by combining various color components, thereby making it possible to observe the localization relationship of a labeled site in the specimen from different viewpoints.

In addition, in the above-described aspect, the depth-extension processing unit may generate a dye-amount image, classified by dye component, by applying unmixing processing to the color image of the specimen and may generate the depth-extended image using the generated dye-amount image.

By doing so, the amounts of dyes can be extracted in such a manner as to improve a decrease in detection accuracy in a labeled site caused by cross-talk of the fluorescence wavelength and the spectral sensitivity characteristics of the image acquisition unit.

In addition, in the above-described aspect, the depth-extension processing unit may adjust the luminance of the dye-amount image generated through the unmixing processing.

By doing so, the visibility for checking whether a labeled site exists can be enhanced by adjusting variations in brightness caused by the abundance of a labeled site, the expression efficiency of a dye, and so forth.

In addition, in the above-described aspect, the depth extension processing performed by the depth-extension processing unit may differ for each of the dyes.

For example, because the cell nucleus in a FISH specimen serves as something like a landmark, it suffices so long as it can be determined whether or not a FISH signal exists in the cell nucleus. Therefore, for the cell nucleus, simplified processing in which, for example, an image having a Z-coordinate with the highest in-focus evaluation score is substituted as the depth-extended image is acceptable.

In this manner, the depth extension processing can be performed at higher speed by making the depth extension processing different for each labeled site. In addition, observation with an appropriate depth-extended image according to the expression manner of a labeled site can be performed.

In addition, the above-described aspect may further include: an image storage unit for time-sequentially storing a plurality of the color images, having different focal positions, that are acquired by the image acquisition unit; and an image playback unit for playing back a plurality of images stored by the image storage unit by displaying the images so as to be switched time-sequentially.

By doing so, observation can be performed through playback with the image playback unit in a state where radiation of illumination light to the specimen is stopped. In short, it is possible to take a long time to perform detailed depth-extended observation, adjustment of observation conditions, and so forth without being concerned about, for example, fluorescence color fading.

In addition, in the above-described aspect, the depth-extension processing unit may generate the depth-extended image by updating pixel-by-pixel depth information of the generated depth-extended image with pixel-by-pixel depth information of the newly acquired color image, the microscope system may include: an updated-pixel-number detection unit for detecting the number of pixels the depth information of which in the color image acquired by the image acquisition unit is updated; and an updated-pixel-number determination unit for determining whether or not the number of pixels detected by the updated-pixel-number detection unit is equal to or smaller than a predetermined threshold value, and the image storage unit may not store the color image when the updated-pixel-number determination unit determines that the number of pixels the depth information of which is updated is equal to or smaller than the predetermined threshold value.

By doing so, the image storage capacity and the playback observation time can be reduced by deleting a color image that does not contribute to depth extension.

In addition, the above-described aspect may further include: an alarm unit that, if a predetermined number of the color images for which it is determined by the updated-pixel-number determination unit that the number of pixels the depth information of which is updated is equal to or smaller than the predetermined threshold value are acquired successively in a time series, reports the same.

By doing so, when it can be determined that the depth extension processing has completed according to the update state of the depth-extended image, the alarm unit can report that the depth extension processing has completed. This eliminates radiation of unnecessary illumination light, maintaining the specimen intact.

In addition, the above-described aspect may further include: a pixel-number display unit for displaying the number of pixels detected by the updated-pixel-number detection unit.

By doing so, the update state of the depth-extended image can be reported by means of the number of pixels displayed on the pixel-number display unit, allowing the observer to quantitatively determine whether or not the depth extension processing should be continued.

In addition, the above-described aspect may further include: a region-of-interest setting unit for setting a region of interest in each of the color images stored in the image storage unit; and a passage display unit for displaying an time-lapse change in the luminance of the region of interest set by the region-of-interest setting unit.

By doing so, an time-lapse change in the luminance of the region of interest can be observed, allowing the observer to grasp a change in the state of the specimen.

In addition, the above-described aspect may further include: a light-blocking detection unit for detecting that illumination to the specimen is blocked, wherein, when the light-blocking detection unit detects that light is blocked, the image playback unit may play back images stored in the image storage unit.

By doing so, the observer is allowed to observe a dynamic image and the depth-extended image while maintaining the specimen intact by playing back images upon detecting a light blocking operation performed by the observer.

In addition, the above-described aspect may further include: an XY-position detection unit for detecting the XY position of the stage set by the XY-axis movement section when each of the color images is acquired by the image acquisition unit; and a displacement calculation unit for calculating a difference in the XY position between two of the color images that are acquired by the image acquisition unit, the two color images adjacent to each other in the time-axis direction, wherein, when the difference calculated by the displacement calculation unit is equal to or greater than a first threshold value, the depth-extension processing unit may start the depth extension processing from the beginning.

By doing so, a field-of-view-movement operation performed by the observer can be detected, and depth extension processing in the moved field of view can be started from the beginning. Because of this, no additional operation for stopping and starting depth extension processing is required, making it possible to generate the depth-extended image by means of the same operation as the normal specimen observation operation.

In addition, in the above-described aspect, the XY positions of the color images may be corrected when the difference calculated by the displacement calculation unit is smaller than the first threshold value and is equal to or greater than a second threshold value.

By doing so, slight image blurring due to vibration etc. can be corrected, thereby enhancing the image quality of the depth-extended image.

In addition, the above-described aspect may further include: a luminance value detection unit for detecting the luminance value of the color image acquired by the image acquisition unit, wherein, when the luminance value detected by the luminance value detection unit is equal to or smaller than a predetermined threshold value, the XY-position detection unit may not detect the XY position.

By doing so, for example, when the observer performs a shutdown operation, erroneous detection of the XY position due to noise information is prevented, allowing the depth-extended image to be maintained.

In addition, another aspect of the present invention provides a microscope system including: a stage on which a multi-dyed specimen is mounted; an objective lens for collecting light from the specimen mounted on the stage; a Z-position operating section for changing the relative position of the stage and the objective lens in a direction along an optical axis of the objective lens; an XY-position operating section for changing the position of the stage in a direction orthogonal to the optical axis; an image acquisition unit for acquiring a color image by capturing the light collected by the objective lens; and a hardware processor, wherein the processor is configured to generate a depth-extended image by performing depth extension processing dye by dye on the basis of a plurality of the color images that are acquired by the image acquisition unit at different positions of the stage relative to the objective lens set with the Z-axis movement section.

The present invention affords an advantage in that a clearly observable depth-extended image can be acquired without missing weak light that comes from a multi-dyed specimen and that has different focal positions.

REFERENCE SIGNS LIST

2 Image acquisition unit
4 Display unit (image display unit, pixel-number display unit, passage display unit)
5 Input unit (display-condition setting unit)
20 Stage
23, 23a, 23b Objective lens
31 Data storage unit (image storage unit)
32 Display processing unit (image playback unit)
34 Depth-extension processing unit
35 XY-movement detection unit (XY-position detection unit, displacement calculation unit)
36 Light-blocking-state detection unit (light-blocking detection unit)
98 Z-axis movement section
99 XY-axis movement section
100 Microscope system
$\alpha 1$ Threshold value (first threshold value)
$\alpha 2$ Threshold value (second threshold value)
L Optical axis
S Specimen

The invention claimed is:

1. A microscope system comprising:
a stage on which a multi-dyed specimen is mounted;
an objective lens for collecting light from the specimen mounted on the stage, the stage being movable in a direction along an optical axis of the objective lens to change a position of the stage relative to the objective lens;
an image sensor for acquiring a color image by capturing the light collected by the objective lens; and
a controller comprising hardware, the controller being configured to generate a depth-extended image by performing depth extension processing dye by dye on the basis of a plurality of the color images that are acquired by the image sensor at different positions of the stage relative to the objective lens;
wherein the controller generates a dye-amount image, classified by dye component, by applying unmixing processing to the color image of the specimen and generates the depth-extended image using the generated dye-amount image.

2. The microscope system according to claim 1, further comprising an image display for displaying a dynamic image that time-sequentially updates the color image acquired by the image sensor and the depth-extended image generated by the controller in a simultaneous and synchronous manner.

3. The microscope system according to claim 2, wherein the controller generates the depth-extended image individually for a different combination of dyes, and
the controller is further configured to receive a signal for setting a display condition for combining the dynamic image and the depth-extended image displayed by the image display.

4. The microscope system according to claim 1, wherein the controller adjusts the luminance of the dye-amount image generated through the unmixing processing.

5. The microscope system according to claim 1, wherein the depth extension processing differs for each of the dyes.

6. The microscope system according to claim 1, further comprising:
an image memory for time-sequentially storing a plurality of the color images, having different focal positions, that are acquired by the image sensor; and
the controller is further configured to play back a plurality of images stored by the image memory by displaying the images so as to be switched time-sequentially.

7. The microscope system according to claim 6, wherein the controller is further configured to:
generate the depth-extended image by updating pixel-by-pixel depth information of the generated depth-extended image with pixel-by-pixel depth information of the newly acquired color image,
detect the number of pixels the depth information of which in the color image acquired by the image sensor is updated; and
determine whether or not the number detected of pixels is equal to or smaller than a predetermined threshold value, and
the image memory does not store the color image when the the determined number of pixels the depth information of which is updated is equal to or smaller than the predetermined threshold value.

8. The microscope system according to claim 7, wherein the controller is further configured to report if a predetermined number of the color images for which it is determined that the number of pixels the depth information of which is updated is equal to or smaller than the predetermined threshold value are acquired successively in a time series.

9. The microscope system according to claim 7, further comprising a pixel-number display for displaying the number of detected pixels.

10. The microscope system according to claim 6, wherein the controller is further configured to:
set a region of interest in each of the color images stored in the image memory; and
display a time-lapse change in the luminance of the set region of interest.

11. The microscope system according to claim 6, wherein the controller is further configured to:
detect that illumination to the specimen is blocked, and
when the light is detected to be blocked, play back images stored in the image memory.

12. The microscope system according to claim 1, wherein the stage is further movable in a plane orthogonal to the direction, the controller being further configured to:
detect a position of the stage in the plane when each of the color images is acquired by the image sensor; and
calculate a difference in the position between two of the color images that are acquired by the image sensor, the two color images being adjacent to each other in a time-axis direction,
wherein, when the difference calculated is equal to or greater than a first threshold value, the controller starts the depth extension processing from the beginning.

13. The microscope system according to claim 12, wherein positions of the color images in the plane are corrected when the calculated difference is smaller than the first threshold value and is equal to or greater than a second threshold value.

14. The microscope system according to claim 12, wherein the controller is further configured to:
detect the luminance value of the color image acquired by the image sensor, and
when the detected luminance value is equal to or smaller than a predetermined threshold value, the controller does not detect the position in the plane.

15. An image processing unit for use with a microscope having a stage on which a multi-dyed specimen is mounted, an objective lens for collecting light from the specimen mounted on a stage, the stage being movable in a direction along an optical axis of the objective lens to change a position of the stage relative to the objective lens, and an image sensor for acquiring a color image by capturing the light collected by the objective lens, the image processing unit comprising:
a controller comprising hardware, the controller being configured to:
generate a depth-extended image by performing depth extension processing dye by dye on the basis of a plurality of the color images that are acquired by the image sensor at different positions of the stage relative to the objective lens;
wherein the controller generates a dye-amount image, classified by dye component, by applying unmixing processing to the color image of the specimen and generates the depth-extended image using the generated dye-amount image.

* * * * *